UNITED STATES PATENT OFFICE.

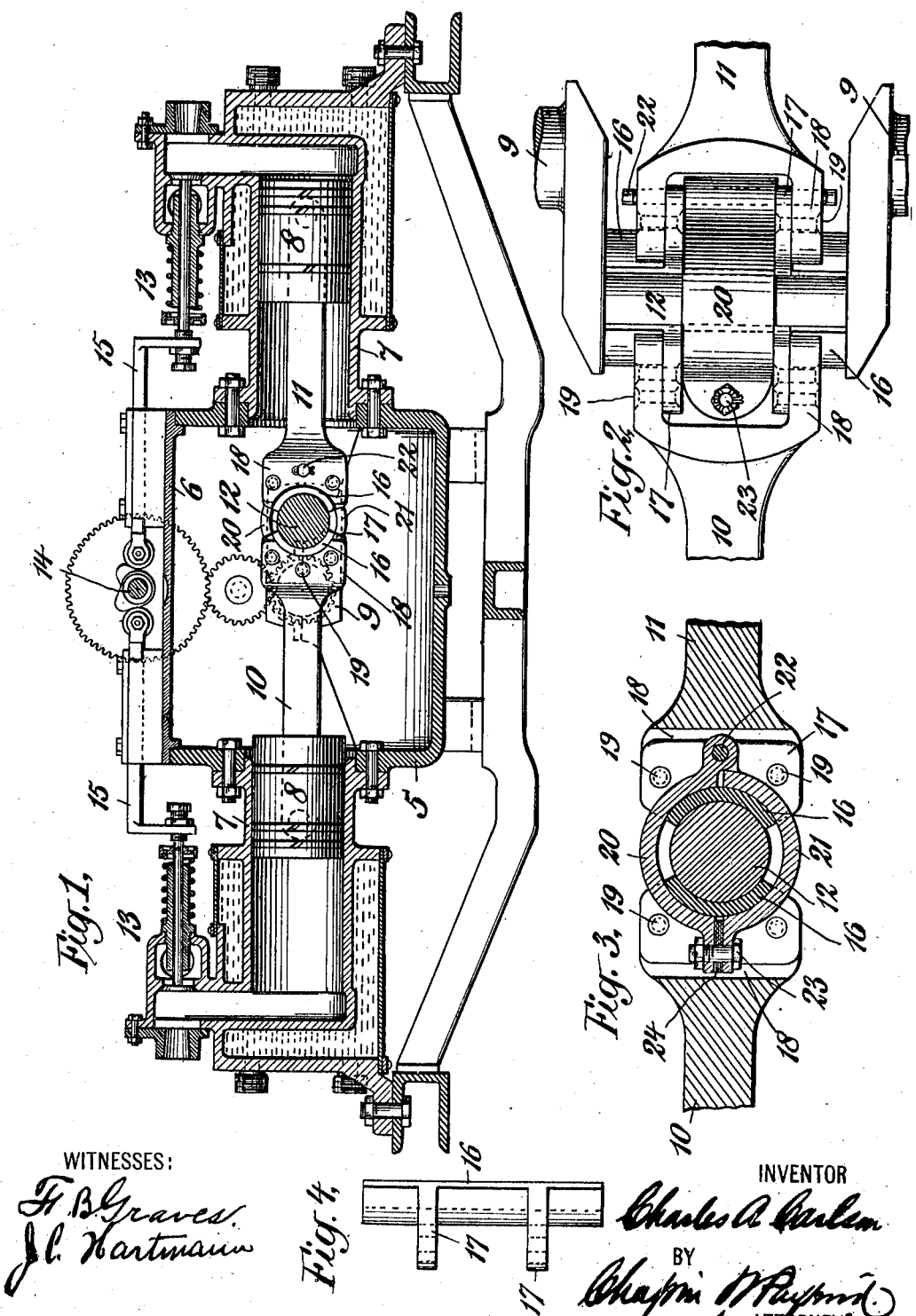

CHARLES A. CARLSON, OF BROOKLYN, NEW YORK, ASSIGNOR TO CARLSON MOTOR & TRUCK COMPANY, OF PHILADELPHIA, PENNSYLVANIA, A CORPORATION OF NEW YORK.

MACHINE ELEMENT.

970,791. Specification of Letters Patent. Patented Sept. 20, 1910.

Application filed July 17, 1909. Serial No. 508,090.

*To all whom it may concern:*

Be it known that I, CHARLES A. CARLSON, a citizen of the United States of America, and a resident of the borough of Brooklyn, county of Kings, and State of New York, have invented certain new and useful Improvements in Machine Elements, of which the following is a specification, reference being had to the accompanying drawings, forming a part thereof.

My invention relates to improvements in machine elements, and particularly to a novel form and construction of connecting rods.

Specifically my invention consists in a novel form and construction of bearing connection for opposed connecting rods whereby the connecting rods are caused to engage a crank pin or similar device in line with each other, and in a means for adjusting the said connection.

The object of my invention is to provide a uniform balanced bearing connection between directly opposed connecting rods and the crank pin, to simplify the manufacture and reduce the cost thereof, to facilitate the assemblage and removal of the parts, and to simplify the means by which adjustment may be made for taking up wear.

In order that my invention may be thoroughly understood, I will now proceed to describe an embodiment thereof, having reference to the accompanying drawings illustrating the same.

In the drawings: Figure 1 is a view in central longitudinal section through an opposed cylinder engine showing a connecting rod construction constituting an embodiment of my invention. Fig. 2 is a top view of the inner bearing members of the connecting rod and the crank pin which they engage. Fig. 3 is a view in central vertical longitudinal section through the parts shown in Fig. 2. Fig. 4 is a detail detached view of one of the bearing members employed.

The connecting rod construction which forms the subject of the present invention may, of course, be employed in various connections, but the particular purpose for which I have designed it is for use in connection with opposed cylinder internal combustion engines, and for the purpose of illustrating the same in use I have, in the present drawings, shown the same as applied to the well-known "Carlson" type of internal combustion engine, such as is disclosed in U. S. Letters Patent No. 797,555 of August 22, 1905.

The engine comprises a central hollow box-like casing 5, a removable cover plate 6 therefor, overhanging cylinders 7—7 supported by the casing, pistons 8 mounted in the said cylinders, a central crank shaft 9, connecting rods 10—11 connecting the said pistons with a cranked portion 12 of the said shaft, valve mechanism 13 carried by the cylinders, and valve operating mechanism including a cam shaft 14 and cam followers 15, carried by the removable cover plate 6 and removable therewith.

The connecting rods 10 and 11 are each provided at their ends contiguous the crank pin 12 with bearing elements which engage the said crank pin. These elements each comprise a tubular segment 16 and outwardly projecting flanges 17, the said flanges being provided for the purpose of securing the said bearing elements to the forked ends 18 of the said connecting rods; the flanges may be conveniently so secured by means of flush rivets 19, as is shown. The two tubular segments 16 each embrace less than one-half the circumference of the crank pin 12, as will be readily understood by reference to the drawings, and particularly to Fig. 3. Fitted to the portion of the bearing elements contained between the flanges 17 is a strap comprising two members 20—21. These two strap members are hinged together by means of a pivot pin 22, the said pivot pin passing through the forked end of the connecting rod 11 whereby the two strap members are not only hinged together but are also hinged to the said connecting rod 11. At the opposite or free ends the said strap members are secured together by means of a bolt and nut 23, and shims or spacing pieces 24 may be conveniently employed for correctly spacing the said strap members apart. This strap being connected to one of the connecting rods only, will permit free rotative rocking movements between the inner ends of the connecting rods as must necessarily occur in the planetary movement of the crank pin 12, while at the same time the strap acts to hold the bearing elements close to the bearing surface of the said crank pin.

For the purpose of adjusting the parts to take up wear it is only necessary to adjust the single bolt and nut 23; if the shims 24 be employed one or more of these shims may be removed to compensate for wear and the bolt and nut again tightened up. It will also be seen that the manipulation of this single bolt and nut is all that is necessary to assemble and disassemble these parts, this being a great convenience in manufacturing and in repairing. The two bearing elements are preferably made as a part separate from the connecting rod ends, and thereafter attached thereto as a convenience in manufacture. The two tubular portions 16 constitute segments of a tube which may, in fact, be formed by cutting away portions of a complete tube. The outside of this tube may readily be finished on the outside in a lathe, and the inside may be bored out, whereby to finish the outer and inner bearing surfaces so that they will be true and easily fitted to the crank pin and strap respectively. After the turning operation has been completed the tube may be cut apart and portions removed so that the tubular segments which remain are each arranged to cover less than one-half of the circumference of the crank pin, and the segments may then be secured to the connecting rods by riveting in the manner above set forth.

The two strap members 20—21, which may be readily removed and replaced by the mere removal and insertion of the pivot pin 22, may be secured together and so bored in a lathe for the purpose of making the internal bearing surfaces true with the outer bearing surfaces of the tubular segments. It will also be noticed that with this form of connection the two connecting rods are arranged exactly opposite to each other, are entirely similar in every manner, and the thrust of the two connecting rods is exactly in a line.

What I claim is:

1. The combination with a crank pin, of opposed connecting rods having forked ends and each provided with a bearing element of tubular segmental form, hinged strap elements surrounding the said bearing elements between the forked ends of the connecting rods, and adjustable means for securing the free ends of the hinged strap elements together.

2. The combination with a crank pin, of opposed connecting rods having forked ends and each provided with a bearing element of tubular segmental form, hinged strap elements surrounding the said bearing elements between the forked ends of the connecting rods, and pivotally connected to one of the said connecting rods.

3. The combination with a crank pin, of opposed connecting rods having forked ends, a tubular segmental bearing element for each said connecting rod and means for fastening it thereto, hinged strap elements surrounding the said bearing elements between the said forked ends of the connecting rods, and means for securing the free ends of the hinged strap elements together.

4. The combination with a crank pin, of opposed connecting rods having forked ends, bearing elements for the connecting rods, each bearing element comprising a tubular segment having flanges which extend outward therefrom, means for securing the flanges of each segment to the forked end of its connecting rod, a hinged strap pivotally connected to one of the connecting rods and surrounding the portions of the tubular segments lying between the flanges thereof, and means for securing the free ends of the hinged strap together.

5. The combination with a crank pin, of opposed connecting rods having forked ends, bearing elements for the connecting rods, each bearing element comprising a tubular segment having flanges which extend outward therefrom, means for securing the flanges of each segment to the forked end of its connecting rod, two strap portions which embrace the said bearing members at points intermediate their ends, a hinge pin for pivotally connecting the two said strap portions together and to one of the said connecting rod ends, and means for connecting the strap portions together at their opposite ends.

6. The combination with a crank pin, of opposed connecting rods having forked ends, bearing elements for the connecting rods, each bearing element comprising a tubular segment having flanges which extend outward therefrom, the said flanges being fitted to the forked ends of the connecting rods respectively and riveted thereto, two strap portions which encircle the said tubular segments between the said flanges, a hinge pin received by the two said straps and by the forked end of one of the connecting rods, whereby the said strap portions are pivoted together and to the said connecting rod, and a bolt and nut for securing the free ends of the strap portions together between the forked end of the other connecting rod.

CHARLES A. CARLSON.

Witnesses:
  F. B. Graves,
  J. C. Hartmann.